United States Patent [19]

Searcy

[11] 4,333,240

[45] Jun. 8, 1982

[54] INSPECTION DEVICE FOR MEASURING THE CONTOUR AND/OR ANGULAR TOLERANCE OF A PART

[75] Inventor: Eugene S. Searcy, Terlton, Okla.

[73] Assignee: Rockwell International Corporation, El Segundo, Calif.

[21] Appl. No.: 150,540

[22] Filed: May 16, 1980

[51] Int. Cl.³ .................................................. G01B 5/20
[52] U.S. Cl. .................................. 33/174 G; 33/174 P
[58] Field of Search .......... 33/174 G, 174 P, 174 PA, 33/169 R, 1 N, 1 BB, 465, 175, 149 R, 424, 174 E

[56] References Cited

U.S. PATENT DOCUMENTS

| 2,545,580 | 3/1951 | Hoppe | 33/174 E |
| 2,579,768 | 12/1951 | Tefft | 33/424 |
| 2,807,092 | 9/1957 | Jones | 33/174 G |

Primary Examiner—Willis Little
Attorney, Agent, or Firm—Charles T. Silberberg

[57] ABSTRACT

A device is disclosed for inspecting whether the surface of a discrete portion of a part is within an allowable tolerance. The device comprises a base adapted to position the part for inspection. A probe is moveably mounted to the base and adapted to engage the surface. The probe, in one preferred embodiment, comprises a member slidably mounted on the base having an edge adapted to engage the surface. A mechanism is provided for limiting the movement of the member to the allowable tolerance of the contour of the surface, such that when the part is positioned for inspection the member will indicate whether the surface is within allowable tolerance if the edge of the member makes contact thereon.

In another embodiment, the probe comprises a member slidably mounted to the base. A protractor, having an edge adapted to uniformly engage the surface, is mounted to the member and rotatable about an axis. A first mechanism is provided for limiting the movement of the member to the allowable contour tolerance and a second mechanism is provided for limiting the rotation of the protractor about the axis to an allowable angular tolerance of the surface. Thus, when the part is positioned for inspection in the base, the edge of the protractor will only make substantially uniform engagement with the surface when the surface is within allowable tolerance and will make at least less than uniform engagement when the surface is out of tolerance.

10 Claims, 6 Drawing Figures

INSPECTION DEVICE FOR MEASURING THE CONTOUR AND/OR ANGULAR TOLERANCE OF A PART

BACKGROUND OF THE INVENTION

1. Field of the Invention

The invention relates to the field of inspection devices and in particular to an improved device for inspecting the contour and angular tolerances of parts such as long extrusions.

2. Background of Prior Art

The prior art method for inspecting parts such as long extrusions, castings, or forgings to determine whether they were in tolerance was time consuming to perform and thus expensive. Typically, a plurality of gauge blocks are placed on an inspection table and brought into contact with an accurately dimensioned template at various inspection locations thereon. The gauge blocks are then secured to the inspection table. The part to be inspected is then brought into contact with as many of the gauge blocks as possible. The gap between any one gauge block and the part indicates a discrepancy with the ideal dimension. In order to determine whether the part is within tolerance, feeler gauges are inserted into the gap. This is obviously a time consuming operation and there is also a considerable chance for error.

An example of this approach is U.S. Pat. No. 2,807,092, Check Assembly by E. E. Jones. Jones' procedure is to mount a template on an inspection table and locate a plurality of gauge members in abutting relationship along the template. The part to be inspected is then aligned on the template and the gap between the gauges blocks and part is measured by go-no go feeler gauges. While making the template an integral part of the inspection procedure reduced the time required to set up the gauge blocks, inspection of the part was not automatic. Further, a large number of gauges must be stocked in order to accommodate parts with different angles.

Another similar approach can be found in U.S. Pat. No. 3,203,100, Checking Fixtures and Method of Making by L. J. Hegedus. Hegedus forms the individual gauge blocks from plate stock by punch forming tabs in the plate and rotating the tabs upright. While this method provides a low cost set of gauge blocks for inspecting the contour and angle of an extrusion or the like, the position of the gauge blocks are set and cannot be changed, and, thus, only one type of part can be inspected. Furthermore, the part must still be checked by the use of feeler gauges.

Therefore, it is a primary object of this invention to provide a device for rapidly and accurately inspecting discrete portions of a part to determine whether they are within allowable tolerances.

It is another object of this invention to provide a device that can inspect a plurality of different parts having different contours and contour tolerances at discrete locations.

It is a further object of this invention to provide a device that can inspect a plurality of different parts having both different contours and angles, with different tolerances at discrete locations.

SUMMARY OF THE INVENTION

The device is a gauge for inspecting whether the surface of a discrete portion of a part is within an allowable tolerance. The device comprises a base adapted to position the part for inspection. A probe is moveably mounted to the base and adapted to engage the surface. The probe, in one preferred embodiment, comprises a member slidably mounted on the base having an edge adapted to engage the surface. A mechanism is provided for limiting the movement of the member to the allowable tolerance of the contour of the surface, such that when the part is positioned for inspection in the base and the member is moved toward the surface, the member will indicate whether the surface is within allowable tolerance if the edge of the member makes contact thereon.

In another embodiment, the probe comprises a member slidably mounted to the base. A protractor, having an edge adapted to uniformly engage the surface, is mounted to the member and rotatable about an axis. A first mechanism is provided for limiting the movement of the member to the allowable contour tolerance and a second mechanism is provided for limiting the rotation of the protractor about the axis of rotation to an allowable angular tolerance of the surface. Thus, when the part is positioned for inspection in the base, and the protractor is moved toward the surface, the edge of the protractor will only make substantially uniform engagement when the surface is within allowable tolerance and will make at least less than uniform engagement when the surface is out of tolerance.

The novel features which are believed to be characteristic of the invention, both as to its organization and its method of operation, together with further objects and advantages thereof, will be better understood from the following description in connection with the accompanying drawing in which presently preferred embodiments of the invention are illustrated by way of examples. It is to be expressly understood, however, that the drawings are for purposes of illustration and description only, and are not intended as a definition of the limits of the invention.

DESCRIPTION OF PREFERRED EMBODIMENT

Figure 1:
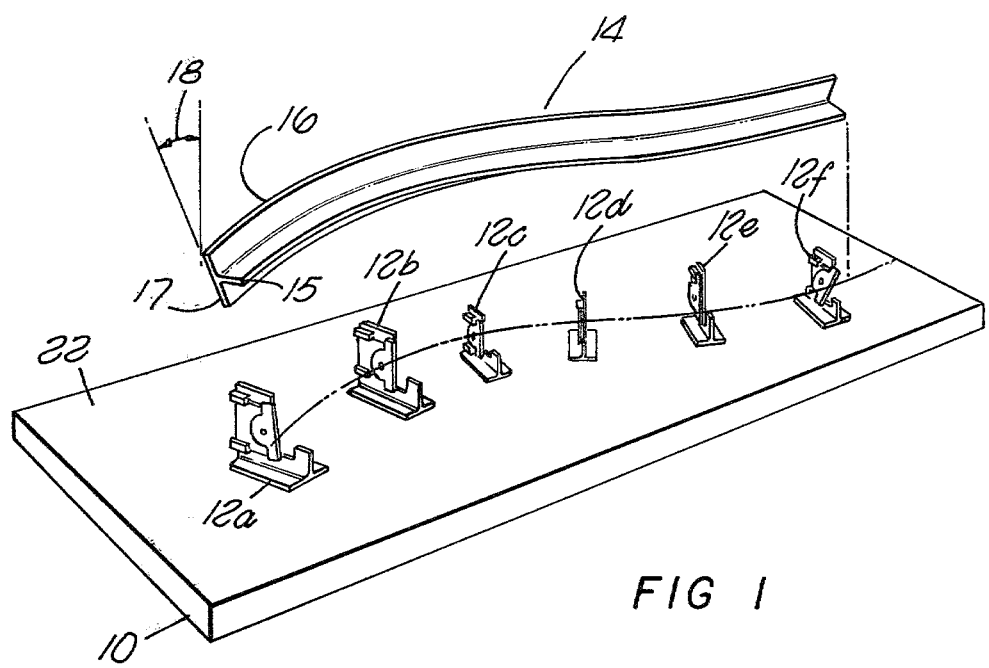
FIG. 1 is a perspective view of an inspection plate having a plurality of inspection devices mounted thereon aligned to inspect an extrusion.
Figure 2:
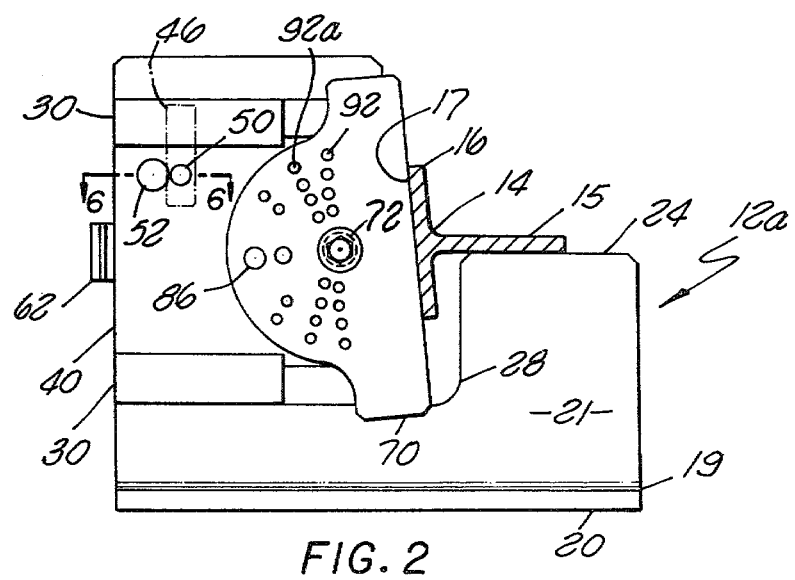
FIG. 2 is a side elevation view of the inspection device.
Figure 3:
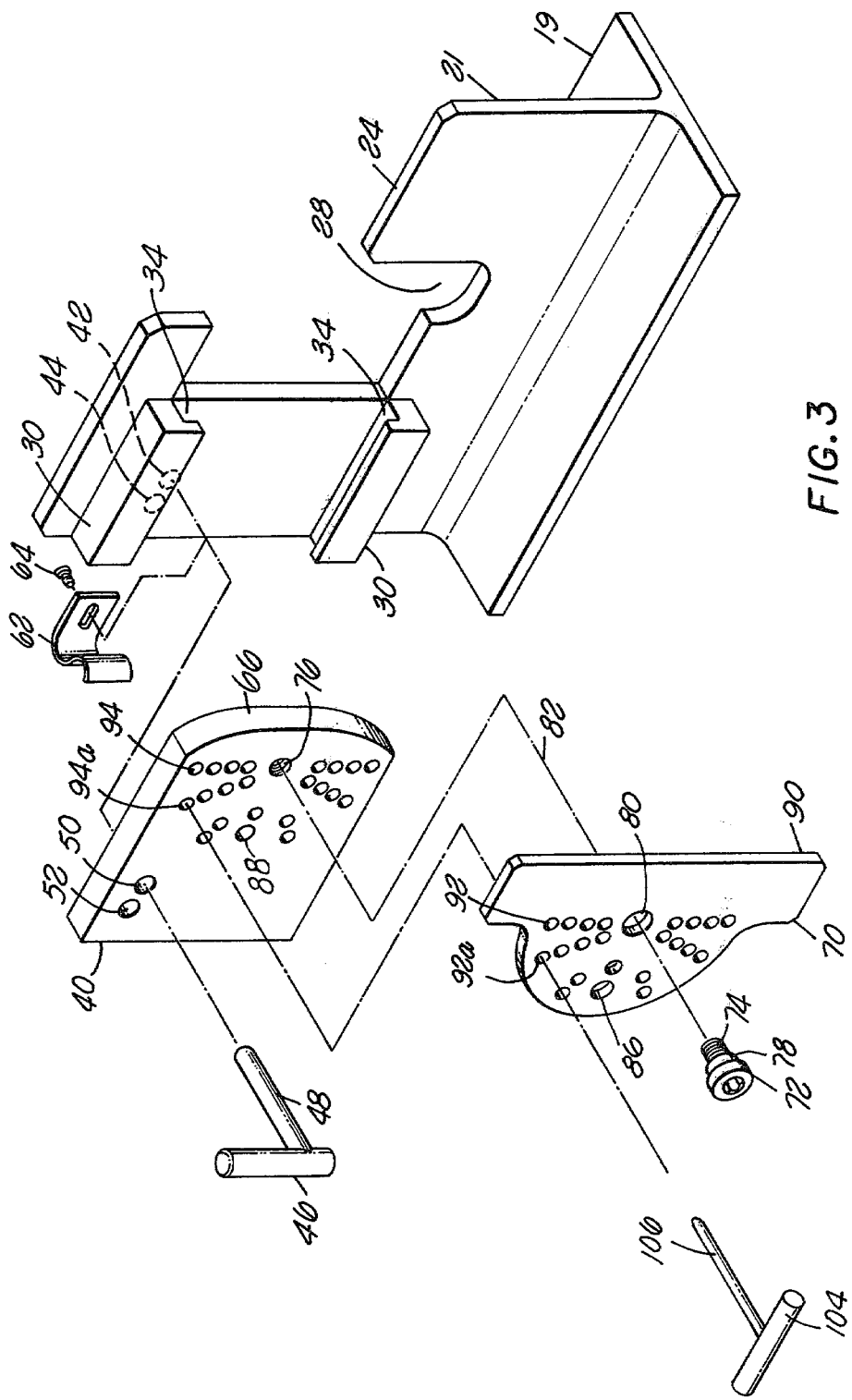
FIG. 3 is an exploded perspective view of the inspection device shown in FIG. 2.

Illustrated in FIG. 1 is a perspective view of an inspection table 10 having a plurality of inspection devices 12a–f mounted thereon aligned to inspect a part, typically in the form of an extrusion 14, while illustrated in FIG. 2 is a side elevation view of the device 12a. Illustrated in FIG. 3 is an exploded perspective view of the device 12a shown in FIG. 2. Referring to FIGS. 1 through 3, it can be seen that the extrusion 14 is in the form of a "T" comprising a leg 15 and shoulder 16. The surface 17 of the shoulder 16 has a contour, i.e., displacement in a plane parallel to plane of the plate 10, and an angle designated by numeral 18 to a plane perpendicular to the plane of the plate 10. The device 12a comprises a base 19 in the form of a "T" having a support member 20 and a vertical beam 21. Preferably, the base 19 is made of steel or other magnetizable material. If this is done, then the inspection plate 10 can be in the form of a conventional magnetic chuck and, thus, the devices 12a-f can be held in place by magnetic force. Of course, other methods can be used to clamp the devices 12a-f in place. For example, bolts extending through apertures in the base 19 engaging threaded holes in the plate 10 (not shown) could be used.

The beam 21 of the base 19 has a surface 24 adapted to support the leg 15 of the extrusion 14 and a notch 28 adapted to receive a portion of the shoulder 16.

Coupled to the beam 21 of the base 19 is a pair of guide members 30 which cooperate with the beam 21 to form channels 34. A member 40 is adapted to slidably mount therein. The beam 21 incorporates at least one aperture, two are shown, designated by numerals 42 and 44. The member 40 incorporates a least one aperture, two are shown and designated by numerals 50 and 52. The member 40 is locked to the beam 21 by means of a pin 46 which has a cylindrical portion 48 adapted to extend through apertures 50 and 42 and apertures 52 or 44. For purposes of illustration, the pin 46 is shown installed in apertures 50 and 42. The diameters of the apertures 42 and 44 are slightly larger than the cylindrical portion 48 of the pin 46, i.e., just sufficient to allow portion 48 to enter therein. On the other hand, the difference in diameters of the portion 48 and apertures 50 and 52 in the member 40 are equal to a particular tolerance of the contour of surface 17 of the extrusion 14. While only two apertures are shown in the member 40 and beam 21, more could be provided giving a large range of tolerances for the contour of surface 17.

The embodiment of the device 12a as described may be used if it is only desired to measure the contour of the extrusion 14. The number of devices required will depend upon the inspection requirements which will vary from part to part. For purposes of illustration, six devices 12a-f are assumed sufficient. The devices 12a-f are placed on the surface 22 of the plate 10. Pin 46 is inserted into apertures 50 and 42 or 52 and 44, depending upon the allowable contour tolerance. The other devices 12b-f are similarly set. Thereafter, the devices 12a-f are roughly aligned to the contour of the extrusion 14. A flat template (not shown) is placed on the surface 24 of the beam 21 of the device 12a and on the corresponding surfaces of the devices 12b-f. The device 12a is adjusted so that edge 66 of the member 40 makes contact with surface 17 of the extrusion 14. The devices 12b-f are similarly adjusted after which plate 10 is energized, locking the devices 12a-f in place. The template is then removed and the extrusion 14 to be inspected is installed. A spring clip 62, secured to the beam 21 by screw 64, biases the member 40 toward the extrusion 14. Thus, member 40 acts as an inspection probe and the operator need only push the extrusion 14 toward the edge 66 and the edges of the other members of devices 12b-f and observe if a gap exists between the surface 17 and the edge 66 to determine if the extrusion 14 is out of contour tolerance.

As previously stated, if aperture 52 is made a different size than aperture 50, different contour tolerances can be accommodated. If a plurality of such apertures are provided, then a large number of different contour tolerances can be measured.

In general, however, it is most often necessary to inspect both the contour and angle 18. This can be accomplished by securing protractor 70 to the member 40 by means of fastener 72. The fastener 72 incorporates a threaded portion 74 adapted to engage threaded hole 76 in the member 40. The fastener 72 has a shoulder portion 78 adapted to engage aperture 80 in the protractor 70. The clearance between the shoulder 78 and aperture 80 should be just sufficient to allow rotation of the protractor about the axis of rotation 82.

Figure 4:
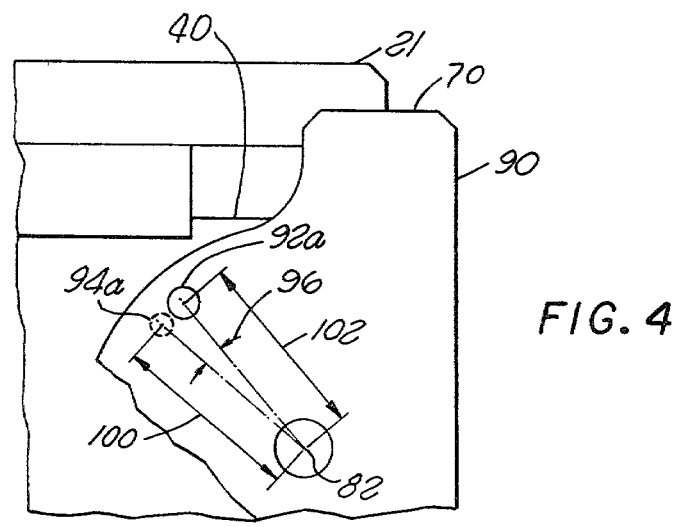
FIG. 4 is an enlarged view of a portion of FIG. 2.
Figure 5:
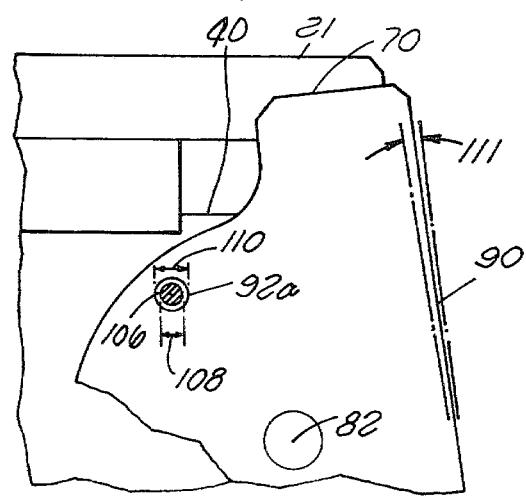
FIG. 5 is an enlarged view of a portion of FIG. 2 showing the device positioned to measure angular tolerance.

Illustrated in FIGS. 4 and 5 are partial views of a portion of FIG. 2 illustrating the means to set the particular angle and tolerance thereof. The protractor 70 and member 40 incorporate apertures 86 and 88, respectively. When these apertures are aligned, and a pin (not shown) is inserted therein, the surface 90 of the protractor 70 is exactly 90 degrees to the direction of horizontal movement of member 40. The protractor 70 and member 40 incorporate a plurality of apertures 92 and 94, respectively, which are grouped and paired such that when the edge 90 of the protractor 70 is at the 90 degree position, the pairs of apertures are separated by precise angular distances about the axis of rotation 82 of the protractor 70.

Particularly referring to FIG. 4, aperture 92a of the protractor 70 is separated from aperture 94a by an angular distance, designated by numeral 96, equal to angle 18 of surface 17 (both shown enlarged for purpose of illustration). The apertures 92a and 94a are at equal radii 100 and 102, respectively, from the axis of rotation 82. Thus, when the pin (not shown) is removed from apertures 86 and 88 in the protractor 70 and member 40, respectively, the protractor 70 may be rotated to a position wherein apertures 92a and 94a are in alignment. Once aligned, a pin 104 can be inserted through the apertures 92a and 94a. The cylindrical portion 106 of the pin 104 has a diameter only nominally smaller than the aperture 94a in the member 40, i.e., just sufficient to allow the pin to enter the aperture. The diameter of the cylindrical portion 106, designated by numeral 108, differs from the diameter 110 of the aperture 92a by the amount of the angular tolerance (designated by numeral 111) of the angle 18 of the surface 17.

Thus, to inspect the surface 17 of the extrusion 14 for both contour and angular accuracy, a pin (not shown) is inserted into apertures 86 and 88 of the protractor 70 and member 40, respectively, so that the edge 90 of the protractor is exactly 90 degrees (perpendicular) to the direction of horizontal movement of the member 40. Pin 46 is inserted into either apertures 50 and 42 or 52 and 44, depending on the contour tolerance of the surface 17. The devices 12a-f are placed on the inspection plate 10. As before, a flat template is used to align the devices, i.e., the device 12a is adjusted so that the edge 90 of the protractor 70 contacts the template. The other devices are similarly set, after which the plate 10 is energized locking the devices in place. The template is removed thereafter, and the pin (not shown) is removed from apertures 86 and 88 in the protractor 70 and member 40, respectively. The protractor 70 is then rotated from the vertical position of 90 degrees to the angle 18 of the surface 17. The pin 104 is then inserted into the aligned apertures 92a and 94a of the protractor 70 and member 40, respectively, thus locking the protractor 70 in the proper angular position. The extrusion 14 is then brought into the position shown in FIG. 2, and pushed towards the edge 90 of the protractor 70 of the device 12a and similarly toward the edges of the protractors of the other devices 12*b–f*. If the surface 17 is within allowable contour and angular tolerance, then the edges will make substantially uniform contact thereon.

Figure 6:
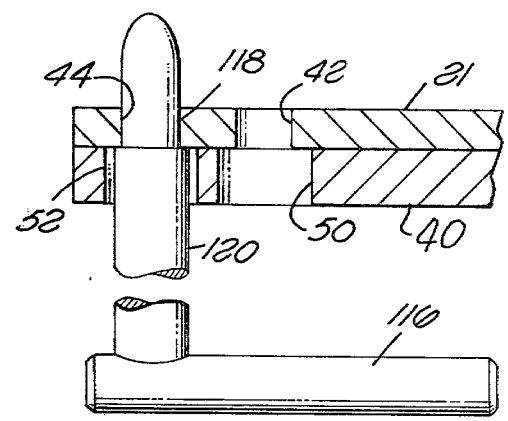
FIG. 6 is a cross-sectional view of a portion of the device shown in FIG. 2 along the lines 6—6 illustrating an alternate pin design.

Illustrated in FIG. 6 is a cross-sectional view along the line 6—6 shown in FIG. 2 illustrating an alternate pin design. The pin 116 is adapted to engage aperture 44 in the beam 21 in the manner previously described. The pin 116 has a second cylindrical portion 120 adapted to engage the aperture 52, the difference between diameters of the aperture 52 and cylindrical portion 120 being equal to the allowable contour tolerance of the surface 17 of the extrusion 14 at the particular discrete location. With such a pin design, different contour tolerances can be accommodated by changing the diameter of the cylindrical portion 120. The pin 116 could also be substituted for the pin 104 used to set the angle of the protractor 70. This would allow a reduction in the number of different protractors necessary to accomodate each different angular tolerance.

Having thus described the invention, it is obvious that numerous modifications and departures may be made by those skilled in the art; thus, the invention is to be construed as being limited only by the spirit and scope of the appended claims.

What is claimed is:

1. A device for inspecting whether the surface of a discrete portion of a part is within allowable tolerance comprising:
   a base adapted to position said part for inspection;
   a probe moveably connected to said base for oscillatory movement relative to said base and adapted to engage said surface; and
   probe limiting means associated with said base and said probe for limiting the movement of said probe to said allowable tolerance of said surface;
   such that when said part is positioned for inspection on said base, said probe will indicate whether said surface is within allowable tolerance by making contact therewith.

2. The device of claim 1 wherein said surface has an angle and contour having allowable tolerances and:
   said probe comprises:
      a member moveably connected to said base, and
      a protractor means connected to said member, rotatable about an axis, having an edge adapted to engage said surface; and
   said probe limiting means comprises:
      first means for limiting the movement of said member to said allowable contour tolerance of said surface; and
      second means for limiting the rotation of said protractor means about said axis to said allowable angular tolerance of said surface.

3. The device of claim 2 wherein said first means comprises:
   said base having a first aperture and said member having a second aperture; and
   a first pin adapted to engage said first and second apertures, the difference in widths of said pin and said second aperture being equal to said tolerance of said contour of said surface,
   such that when said first pin is engaged with said first and second apertures, said first pin limits said movement of said member to said tolerance of said contour of said surface.

4. The device of claim 3 wherein said first pin comprises:
   a first portion adapted to engage said first aperture and a second portion adapted to engage said second aperture, the difference in width of said second portion of said pin and said second aperture being equal to said tolerance of said contour of said surface;
   such that different widths can be used for said second portion of said first pin to vary the allowable tolerance of said contour of said surface.

5. The device of claim 2 or 3 or 4 wherein said second means comprises:
   said member having a third aperture and said protractor means having a fourth aperture, said third and fourth apertures being substantially at equal distances from said axis of rotation of said protractor means; and
   a second pin adapted to engage said third and fourth apertures, the difference in width of said pin and said fourth aperture being equal to said tolerance of said angle of said surface;
   such that when said second pin is engaged with said third and fourth apertures said second pin limits said rotation of said protractor means to said angular tolerance of said surface.

6. The device of claim 5 wherein said second pin comprises:
   a first portion adapted to engage said third aperture and a second portion adapted to engage said fourth aperture, the difference in width of said second portion of said second pin and said fourth aperture being equal to said tolerance of said angle of said surface;
   such that different widths can be used for said second portion of said second pin to vary the allowable tolerance of said angle of said surface.

7. The device of claim 6 wherein there are a plurality of said third and fourth apertures separated about said axis by different angles.

8. The device of claim 1 wherein said surface has an allowable contour tolerance and:
   said probe comprises a member slidably mounted on said base having an edge adapted to engage said surface; and
   said probe limiting means comprises:
      said base having a first aperture and said member having a second aperture; and
      a pin adapted to engage said first and second apertures, the difference in widths of said pin and said second aperture being equal to said tolerance of said contour of said surface,
      such that when said first pin is engaged with said first and second apertures, said pin limits said movement of said member to said tolerance of said contour of said surface.

9. The device of claim 2, or 3, or 4, or 8 further including biasing means attached to said base adapted to urge said member toward said surface.

10. The device of claims 1, 2, 3, or 8 also including a platform, said base being magnetically mounted to said platform.

* * * * *